Jan. 21, 1930.  A. T. WAKEFIELD  1,744,186
VALVE MECHANISM FOR MEASURING PUMPS
Filed Sept. 17, 1928   2 Sheets-Sheet 1
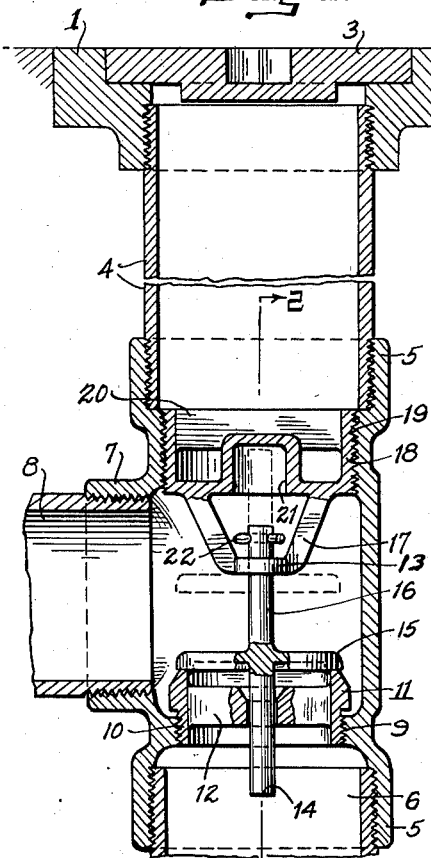
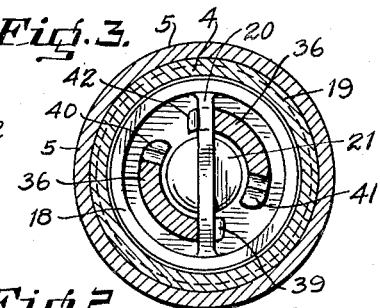
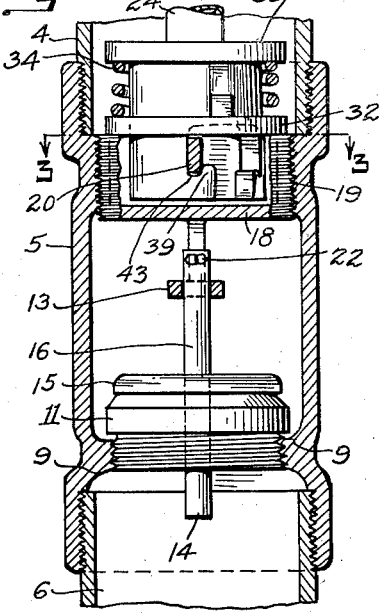
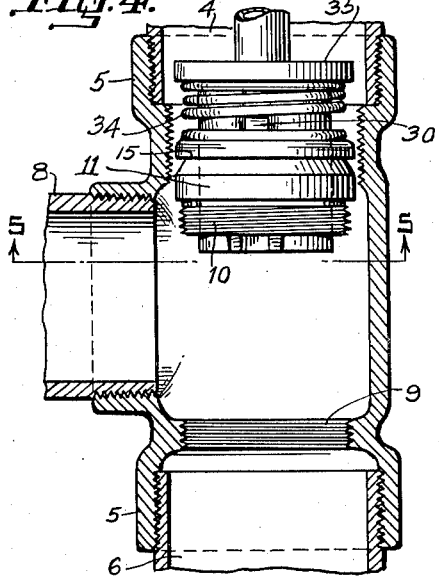
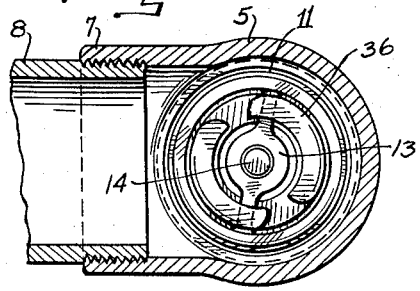
Inventor
*Arthur T. Wakefield*
By *Mason Fenwick Lawrence*
Attorneys Jan. 21, 1930.    A. T. WAKEFIELD    1,744,186
VALVE MECHANISM FOR MEASURING PUMPS
Filed Sept. 17, 1928    2 Sheets-Sheet 2
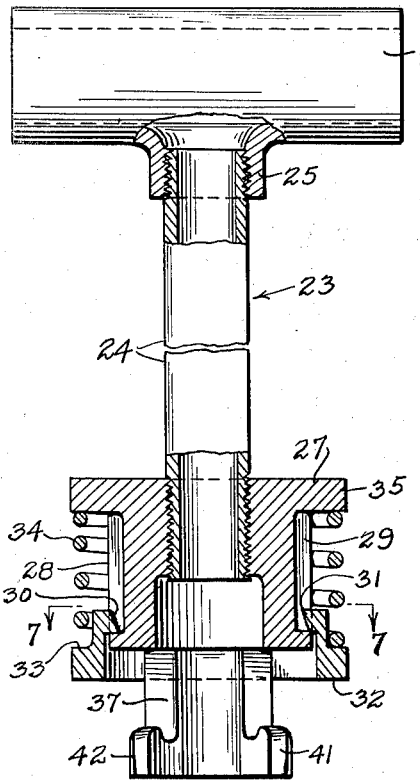
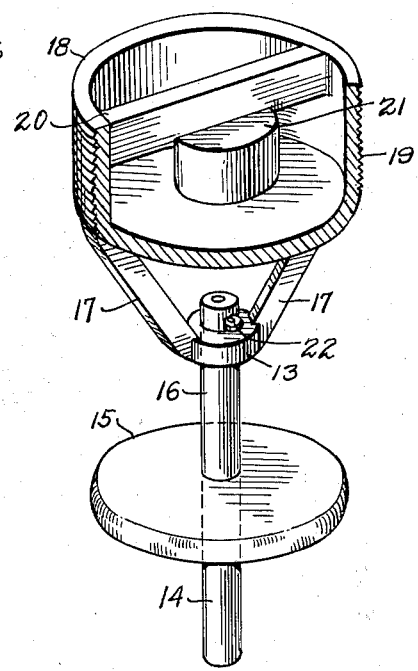
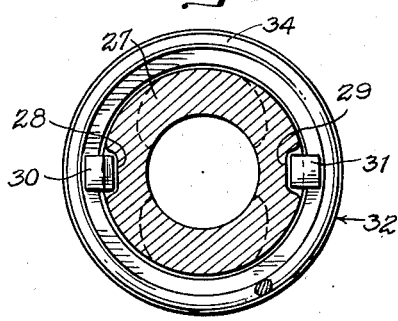
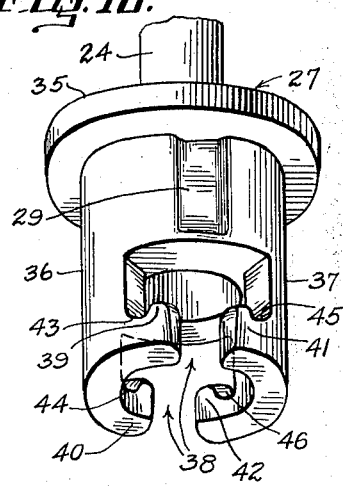
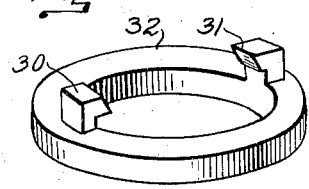
Inventor
Arthur T. Wakefield
By Mason Fenwicke Lawrence
Attorneys Patented Jan. 21, 1930

1,744,186

UNITED STATES PATENT OFFICE

ARTHUR T. WAKEFIELD, OF BALTIMORE, MARYLAND, ASSIGNOR TO THE AMERICAN OIL COMPANY, OF BALTIMORE, MARYLAND

VALVE MECHANISM FOR MEASURING PUMPS

Application filed September 17, 1928. Serial No. 306,422.

This application is a continuation-in-part of my copending application, Serial No. 228,053, filed October 22nd, 1927, and my application, Serial No. 157,855, filed December 29th, 1927.

The invention forming the subject matter of the present application relates to the dispensing of liquid fuel, such as gasoline, etc., from filling stations; and is designed primarily to effect accurate and speedy measurement and dispensing of liquid from underground storage tanks.

The object of the present invention is to simplify the valve mechanism used in piping connecting underground storage tanks to dispensing pumps for the purpose of dispensing measured quantities of liquid from said tanks.

In common with the apparatus disclosed in the above identified pending application, the present invention includes a pipe extending substantially perpendicularly from an underground storage tank to the ground and also includes a T-fitting arranged between the tank and the ground to feed liquid from the tank to a dispensing pump arranged on the ground and to one side of the said pipe. In the said application, the valve mechanism is wholly supported by the lower end of the T-fitting; and the upper end of this fitting is provided with a plug to prevent the formation of air pockets in the discharge pipe above the fitting.

The present invention combines the plug and valve mechanism in a unitary structure, having parts which may be separately removed from the discharge pipe. This combination results in a greatly simplified construction which can be more cheaply manufactured than the prior construction and can be more readily assembled and removed for purposes of repair or replacement.

Another object of the invention is to simplify the mechanism for removing the valve from the discharge pipe through a manhole cover at the ground level.

Other objects of the invention will appear as the detailed description thereof proceeds.

In the drawings:

Figure 1 is a fragmentary central section through the valve mechanism embodying this invention;

Figure 2 is a section similar to that shown in Figure 1, but also showing in elevation a valve removing tool applied to the plug part of said mechanism;

Figure 3 is a horizontal section on the line 3—3 of Figure 2;

Figure 4 is a fragmentary vertical section of the valve casing with the upper part of the valve mechanism removed and showing the lower part of the valve mechanism being removed by a special tool through the valve casing;

Figure 5 is a horizontal section on the line 5—5 of Figure 4;

Figure 6 is a fragmentary elevation of a valve removing tool having parts thereof shown in vertical section;

Figure 7 is a horizontal section on the line 7—7 of Figure 6.

Figure 8 is a perspective view of a ring member forming part of the valve removing tool;

Figure 9 is a perspective view of the plug part of the valve mechanism combined with a guide support for the valve stem; and Figure 10 is a perspective view of the lower valve engaging part of the valve removing tool.

In the drawings, the reference numeral 1 designates a manhole casing embedded in the ground 2 and provided with manhole cover 3 suitably and detachably secured to the casing 1. The lower part of the casing 1 is screwthreaded to receive the screwthreaded upper end of a pipe 4, which at its lower end is provided with screw threads adapted to receive the screwthreaded upper end of a valve casing 5.

The valve casing 5 forms a T-joint having its lower end screwthreaded to receive and support the upper screwthreaded end of a discharge pipe 6, which has its lower end connected to an underground storage tank (not shown). Projecting horizontally from the center of the casing 5 is a screwthreaded cylindrical element 7, connected to a pipe 8 leading to a measuring pump (not shown).

The valve casing 5, immediately below the pipe 8 is provided with a screwthreaded inward extension 9 adapted to receive the screwthreaded end 10 of a valve seat 11.

The valve seat 11 is cylindrical and has a bridge member 12 extending diametrically thereof, and provided with a central bushing apertured to form a guideway for a valve stem 14 which projects downwardly from a valve disk 15. The valve disk 15 has its lower face ground to fit the top of the valve seat 11 and has a stem 16 extending upwardly and in alinement with the stem 14. The stem 16 is guided slidably in an aperture centrally formed in a bridge 17 extending downwardly from a plug 18 which is screwthreaded into an inward extension 19 in the upper part of the valve casing 5.

The upper part of the plug 18 is formed as a hollow cylinder and centrally thereof has a bridge 20 extending diametrically across it, and the center part of the plug is provided with a cylindrical recess 21 having walls which contact with the bridge 20 to strengthen and support it. The recess 21 also forms a pocket adapted to receive the upper end of the valve stem 16 and a cotter pin 22 which secures the stem 16 slidably in the bridge 17.

It will be apparent from the several figures of the drawing that the extension 19 is of greater diameter than the diameter of the lower extension 9, and thereby permits the valve seat 11 to be removed freely through the extension 19 whenever it becomes necessary or desirable to do so.

In order to remove the valve mechanism from the valve casing 5 a special tool 23 is used. The tool 23 comprises a stem 24 screwthreaded at the top to engage a nipple extending laterally from a handle 26. The lower part of the stem 24 is screwthreaded and has a cylindrical member 27 screwthreaded and pinned onto the lower end of stem 24. The member 27 is provided with diametrically opposite slots 28 and 29 which form guideways for projecting lugs 30 and 31 extending inwardly from an annular member 32.

The annular member 32 is provided with a flange 33 adapted to form an abutment for one end of a coil spring 34, the other end of which abuts against the flange 35 projecting from the upper end of the cylindrical member 27. The spring 34 normally maintains the bottom of the annular member 32 below the bottom face of the member 27; and, obviously may be compressed to permit the bottom of member 32 to become flush with the bottom of member 27.

Extending from the bottom of the member 27 are the cylindrical projections 36 and 37 having a slot 38 between them adapted to permit the projection 36 and 37 to straddle the bridge 20 of the valve plug 19 and the bridge 12 of the valve seat 11. The projections 36 and 37 are provided with recesses extending outwardly from the slot 38 to form lugs 39 and 40 extending laterally from the projection 36, and to form lugs 41 and 42 extending laterally from the projection 37.

At the intersection of the lugs 39 and 40 with the sides of the projection 36, recesses 43 and 44 are formed to seat under and engage the bottom of bridge 20 or bridge 12 when the tool 23 is rotated to cause either side of the projection 36 to engage with one side or the other of either of said bridges. Similarly recesses 45 and 46 are formed at the intersection of lugs 41 and 42 with the opposite sides of projection 37, and serve the same purpose as the recesses 43 and 44.

Figure 2 of the drawing shows the tool 23 applied to the plug 18 to effect removal thereof from the inwardly projecting extension 19 on the valve casing 5. As shown in this figure, the tool has been pressed downwardly with the flange 32 in engagement with the top of plug 19 to compress the spring 34 and thereby cause the recesses 43 and 46 of the projections 36 and 37, respectively, to seat under the opposite ends of the bridge 20, in order to effect removal of the plug 18 from the extension 19, or to effect the insertion of the plug as desired. The operation of the tool will be obvious from inspection of the drawing and need not be further described in detail herein.

It will be apparent from Figure 1 that the bottom of bridge 17 forms a stop for the upper face of the valve disk 15; and, that when the plug 18 is removed from the casing 5, the valve 15 is removed along with said plug. When the plug and the valve disk 15 are removed from the casing, the valve seat 11 may then be removed by the same tool in the same manner as the plug is removed. The operation of removing the valve seat is clearly shown in Figures 4 and 5 in which the valve seat is illustrated as connected to the lower part of the tool 23 and in movement through the extension 19 of the valve casing 5.

It will be apparent that I have provided a very simple combined plug and valve mechanism which can be very cheaply manufactured and readily assembled or disassembled, and which is of the utmost simplicity and very unlikely to get out of order under normal working conditions.

I claim:

1. A valve casing having a pipe extending laterally therefrom intermediate the ends thereof, valve mechanism having separable parts detachably seated in said casing on opposite sides of said pipe, means on one end of each of said parts adapted to be engaged by a key for seating or unseating said parts, and a key engageable with each of said means.

2. A valve casing having a pipe extending laterally therefrom intermediate the ends thereof, valve mechanism comprising separable hollow cylindrical parts detachably seated in said casing on opposite sides of said pipe, a bridge extending diametrically across each of said parts, and a key interlockably engageable with each of said bridges to effect the removal or seating of said parts from or in said casing.

3. Valve mechanism comprising a casing having a pipe extending laterally therefrom intermediate the ends thereof, a cylindrical plug closing one end of said casing at one side of said pipe, a cylindrical valve seat in said casing at the other side of said pipe, a bridge extending across said valve seat and having an aperture through the center thereof, a bracket extending from said plug toward said valve seat and having an aperture therethrough, a valve having guide stems on opposite sides thereof slidable in said apertures, and means on the side of said plug opposite to said bracket and engageable with a key to effect removal of the plug from said casing.

In testimony whereof I affix my signature.

ARTHUR T. WAKEFIELD.